United States Patent [19]

Hoppenstedt et al.

[11] Patent Number: 5,388,400
[45] Date of Patent: Feb. 14, 1995

[54] DIESEL ENGINE EXHAUST REGENERABLE FILTER SYSTEM

[75] Inventors: Bruce B. Hoppenstedt, Bloomington; Wayne M. Wagner, Apple Valley; Ervin P. Fuchs, Farmington; Edward A. Steinbrueck, Eden Prairie, all of Minn.

[73] Assignee: Donaldson Company, Inc., Minneapolis, Minn.

[21] Appl. No.: 998,839

[22] Filed: Dec. 30, 1992

[51] Int. Cl.⁶ .................................................. F01N 3/02
[52] U.S. Cl. ........................................ 60/274; 60/286; 60/303
[58] Field of Search ...................... 60/274, 286, 303; 55/283, 466, DIG. 30

[56] References Cited

U.S. PATENT DOCUMENTS

| | | |
|---|---|---|
| 4,404,795 | 9/1983 | Oishi et al. . |
| 4,427,418 | 1/1984 | Kogiso .................................. 60/303 |
| 4,478,618 | 10/1984 | Bly et al. . |
| 4,573,317 | 3/1986 | Ludecke . |
| 4,791,785 | 12/1988 | Hudson ................................. 60/303 |
| 4,829,766 | 5/1989 | Henkel .................................. 60/303 |
| 4,851,015 | 7/1989 | Wagner et al. . |
| 4,899,540 | 2/1990 | Wagner et al. ....................... 60/274 |
| 4,902,877 | 2/1990 | Grasso et al. . |
| 5,024,054 | 6/1991 | Barris et al. . |
| 5,042,249 | 8/1991 | Erdmannsdoerfer . |
| 5,195,319 | 3/1993 | Stobbe ................................. 60/303 |

*Primary Examiner*—Douglas Hart
*Attorney, Agent, or Firm*—Merchant, Gould, Smith, Edell, Welter & Schmidt

[57] ABSTRACT

Diesel engine exhaust filter system for off-road vehicles. The system has a trap device and controlling mechanism on the vehicle. An electrical power source and a combustion air source are off-board. The controlling mechanism monitors backpressure to determine when regeneration is required. The vehicle is parked at a regeneration station for connection to the air source and power source for regeneration, which is then controlled by the controlling mechanism on-board.

10 Claims, 16 Drawing Sheets

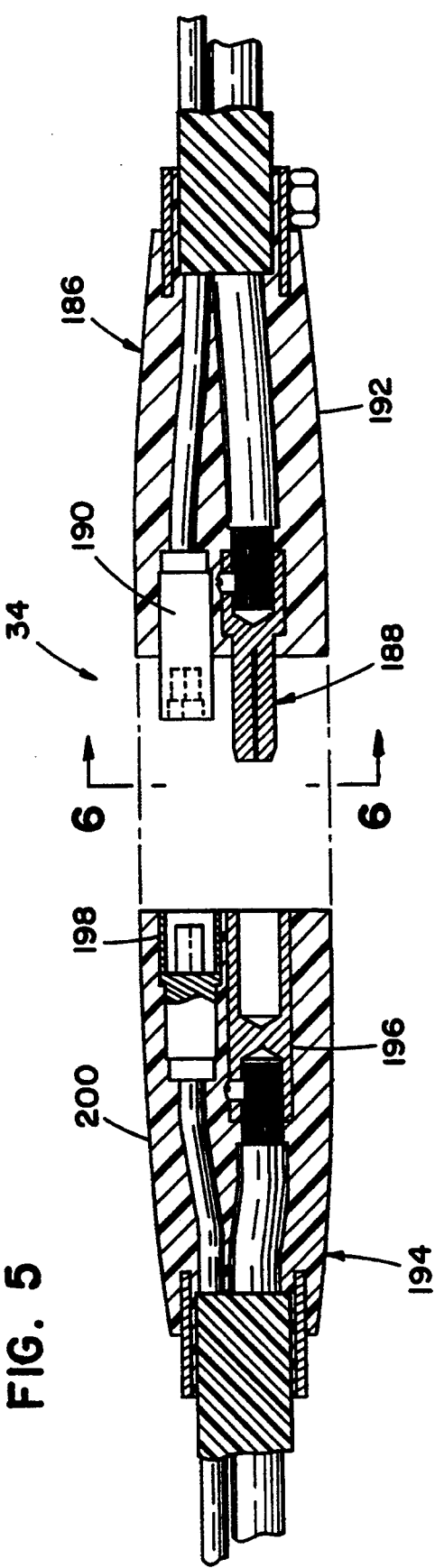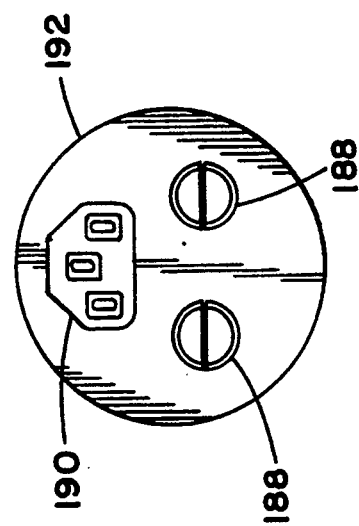
FIG. 5
FIG. 6

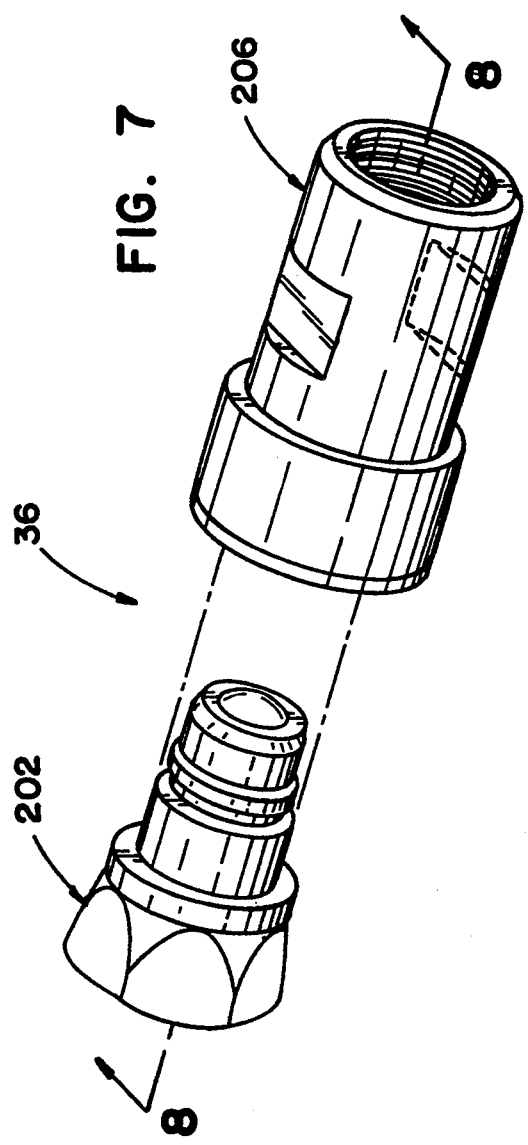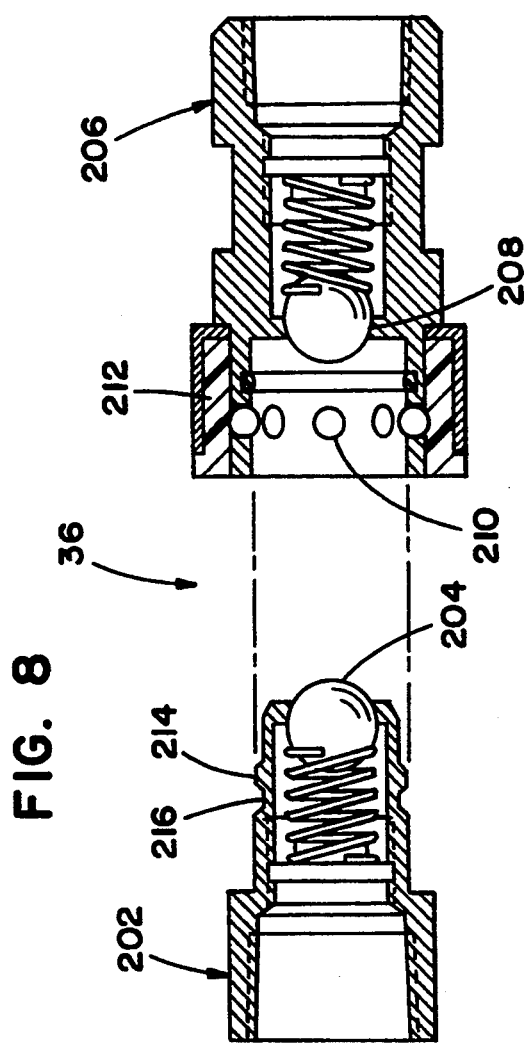

DIESEL ENGINE EXHAUST REGENERABLE FILTER SYSTEM

FIELD OF THE INVENTION

The present invention is directed to a diesel engine exhaust trap system and, in particular, a system of a type having a regeneration arrangement with electrical power source and combustion air source off-board, while the trap device and regeneration control are on-board.

BACKGROUND OF THE INVENTION

Diesel engines are generally more powerful, more efficient, and easier to maintain than other types of engines. As a result, most users of off-road vehicles, such as fork-lift trucks, prefer diesel power. The primary disadvantage of diesel is soot. Soot from diesel engines contains sulfates and soluble organics, as well as carbon particles. In an enclosed space, soot creates a dirty, unpleasant, and unproductive working environment. As a result, it is clear that diesel power requires filtration when it is used in an enclosed work space.

Filter traps for diesel engines are well known. Regenerable filter traps for over-the-road vehicles, have on-board regeneration capability and may include more than one trap or various divisions of filters within the same trap housing so that one portion can be regenerated while others continue to filter. Such sophistication is too costly for off-road vehicles.

With respect to off-road vehicles, diesel soot traps are also known. Such traps are known to remove more than 90 percent of particulates in the exhaust. The problem is that regeneration has traditionally required hours. Such downtime for a fork-lift truck, for example, becomes very expensive. Consequently, it is clear that there exists a need for an inexpensive regeneration arrangement which functions quickly with respect to off-road vehicles.

SUMMARY OF THE INVENTION

The present invention is directed to an exhaust filter system for a vehicle with a diesel engine. The system includes a trap device mounted on the vehicle for the purpose of removing particulates from the exhaust gases of the engine. The trap device includes a filter installed in a housing. The system also includes a regeneration arrangement for the trap device. The regeneration arrangement includes a heater in the trap device on the vehicle in close proximity to the filter in the housing. The arrangement further includes mechanism separate from the vehicle for providing electrical power to the heater for regeneration of the filter and mechanism separate from the vehicle for providing combustion air for regeneration. The system also has mechanism mounted on the vehicle for controlling the regeneration arrangement.

As indicated, the trap device and controlling mechanism are on board the vehicle, while the power providing and the combustion air providing mechanisms are off-board. The controlling mechanism provides an indication when regeneration may occur. It provides a further indication when regeneration must occur. When the operator decides to park the vehicle for regeneration, the electrical power providing mechanism and the combustion air providing mechanism are connected as appropriate to the trap device and the controlling mechanism. In that regard, high voltage power is stepped down to provide high current for the heaters of the various filters with the heaters connected electrically in parallel.

In an alternate embodiment, when the heaters are connected in series, the high voltage power source is appropriately switched according to the sequencing of the controlling mechanism, but the high voltage and lower current is supplied directly to the trap device. With the present arrangement, for either a series or parallel electrical connection of the heaters, sufficient power is applied rapidly so that regeneration of the trap device takes place in only a few minutes.

According to the method of using the present invention, while the engine is running, backpressure to the engine from the trap device is sensed and an associated electrical signal is created. The electrical signal is appropriately electrically filtered, and an indication that the trap device may be regenerated is provided when a first ratio is greater than a first predetermined value. The first ratio is a first measured time the filtered signal is greater than a first predetermined level relative to a first predetermined time. The predetermined value for the first ratio which allows the trap device to be regenerated is generally chosen to be 0.75, often referred to as a 75% loading level. Regeneration, however, cannot take place until after the engine is stopped.

The present invention provides for a second indication that the trap device must be regenerated, following the first indication that it may be. The second indication signals a fully loaded condition of the filters in the trap. The fully loaded condition is determined when a second ratio is greater than a second predetermined value. The second ratio is a second measured time the filtered signal is greater than the predetermined level relative to a second predetermined time. The predetermined value for the second ratio is chosen to be 1.0 thereby requiring that the filtered signal be greater than the predetermined level for the entire time considered. Generally, the second predetermined time is chosen to be significantly longer than the first predetermined time. Thus, the first ratio identifies an early level of loading at which regeneration may be sustained without quenching, while the second ratio identifies a truly loaded filter condition.

When regeneration is initiated, the present invention provides for the heater preferably to preheat before combustion air is turned on. Then near the end of regeneration, the heater preferably is turned off before the combustion air stops flowing. In this way, the heater can heat without the cooling influence of combustion air in the beginning, while the continuance of combustion air at the end not only allows combustion to run its course, but also helps cool the heater.

The present invention then is directed to an exhaust filtration system for off-road vehicles. It provides for the application of high power in a short time to achieve a rapid regeneration, thereby limiting the downtime of the vehicle. In this way, the present invention supports the desire of operators of off-road vehicles, like fork-lift trucks, to use diesel engines.

BRIEF DESCRIPTION OF THE DRAWINGS

FIG. 5 is a cross-sectional view of the electrical connector in accordance with the present invention;

FIG. 6 is an end-view of the plug of FIG. 5 as taken along line 6—6 of FIG. 5;

FIG. 7 is a perspective view of the combustion air connector in accordance with the present invention;

FIG. 8 is a cross-sectional view taken along line 8—8 of FIG. 7;

DETAILED DESCRIPTION OF THE PREFERRED EMBODIMENTS

Figure 1:
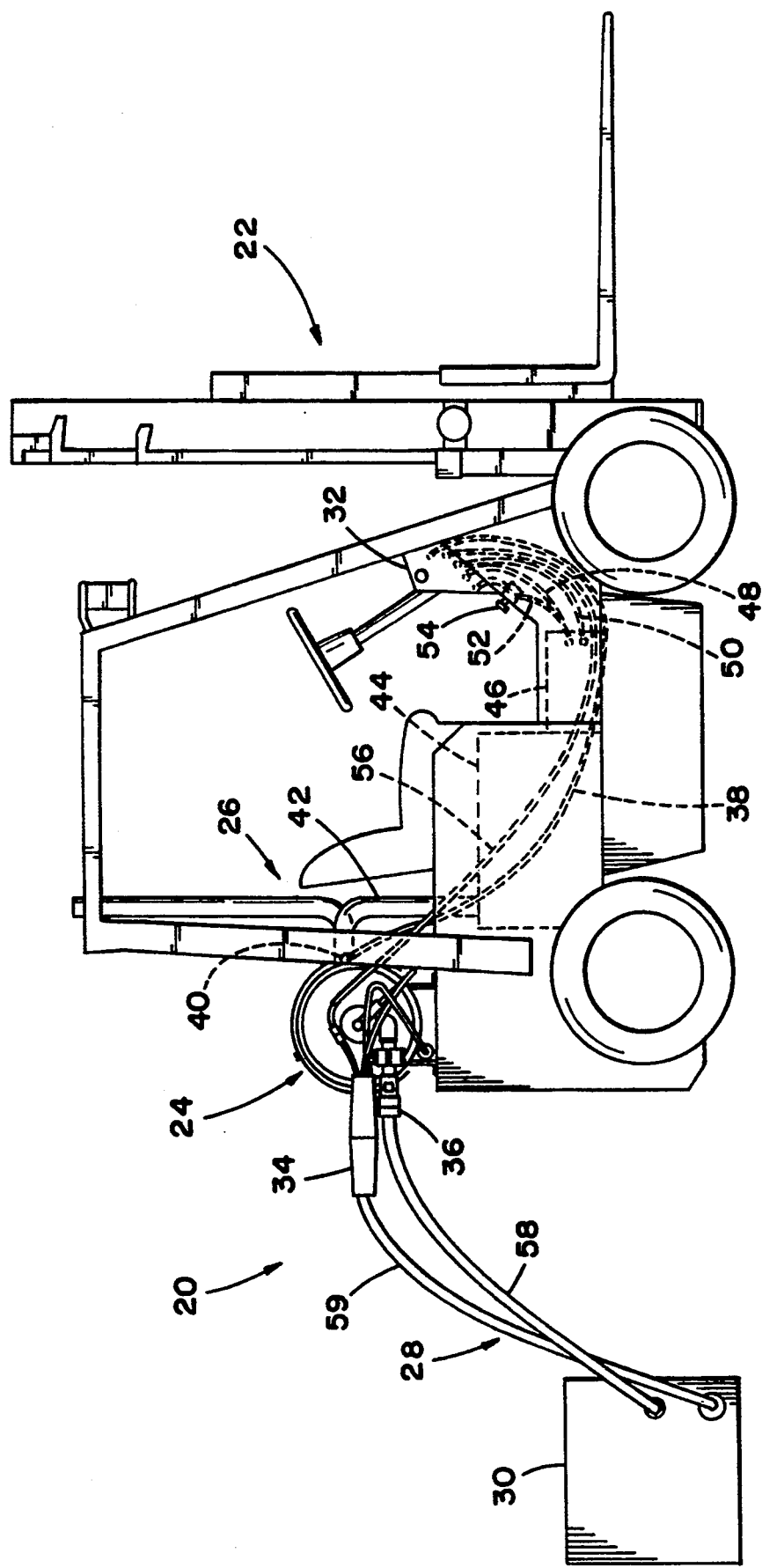
FIG. 1 is a side-view of a fork-lift truck having an exhaust filter system in accordance with the present invention, showing the system connected for regeneration.

Referring now to the drawings wherein like reference numerals designate identical or corresponding parts throughout the several views, and more particularly to FIG. 1, an exhaust filter system in accordance with the present invention is designated generally by the numeral 20, shown relative to a fork-lift truck 22. The fork-lift truck is representative of other diesel powered vehicles. Exhaust filter system 20 includes trap device 24 mounted as a part of the exhaust assembly 26 of fork-lift 22. The exhaust filter system 20 also includes regeneration arrangement 28 for trap device 24. Regeneration arrangement 28 has components both on and off fork-lift 22. Regeneration arrangement 28 includes housing 30 which provides a power source 360 and an air source 362. Exhaust filter system 20 has controlling mechanism 32 mounted on fork-lift 22. Controlling mechanism 32 monitors the loading of trap device 24 and when the power source 360 and the air source 362 are appropriately connected, controls the regeneration process.

During operation of fork-lift 22, connectors 34 and 36 are disconnected. An air line 38 extends from a port 40 in the exhaust inlet tube 42 extending between engine 44 and trap device 24. Air line 38 is in fluid communication with a pressure transducer (not shown) in controlling mechanism 32. The pressure transducer monitors backpressure from trap device 24 to engine 44. Fork-lift power is provided to controlling mechanism 32 from battery 46 via cables 48 and 50. In addition, a cable 52 through ignition switch 54 provides a separate source of electrical power from battery 46 to controlling mechanism 32. Electrical line 56 leads from controlling mechanism 32 to connector 34. Connector 34 provides continuity of power via cable 59 from the power source 360 mounted in housing 30 to heaters 102 in trap device 24 and also to controlling mechanism 32. Combustion air is provided trap device 24 from the air source in housing 30 through air line 58 when connector 36 is engaged.

Thus, the present invention provides for the trap device to be monitored by the controlling mechanism with power constantly supplied to the controlling mechanism by the battery of the fork-lift. When regeneration is allowed or required, the fork-lift is parked so that the power and air sources can be connected to provide a regeneration. The control mechanism then controls the sequencing of application of power and air in a rapid and efficient regeneration of the filters in the trap device.

Trap Device

Figure 2:
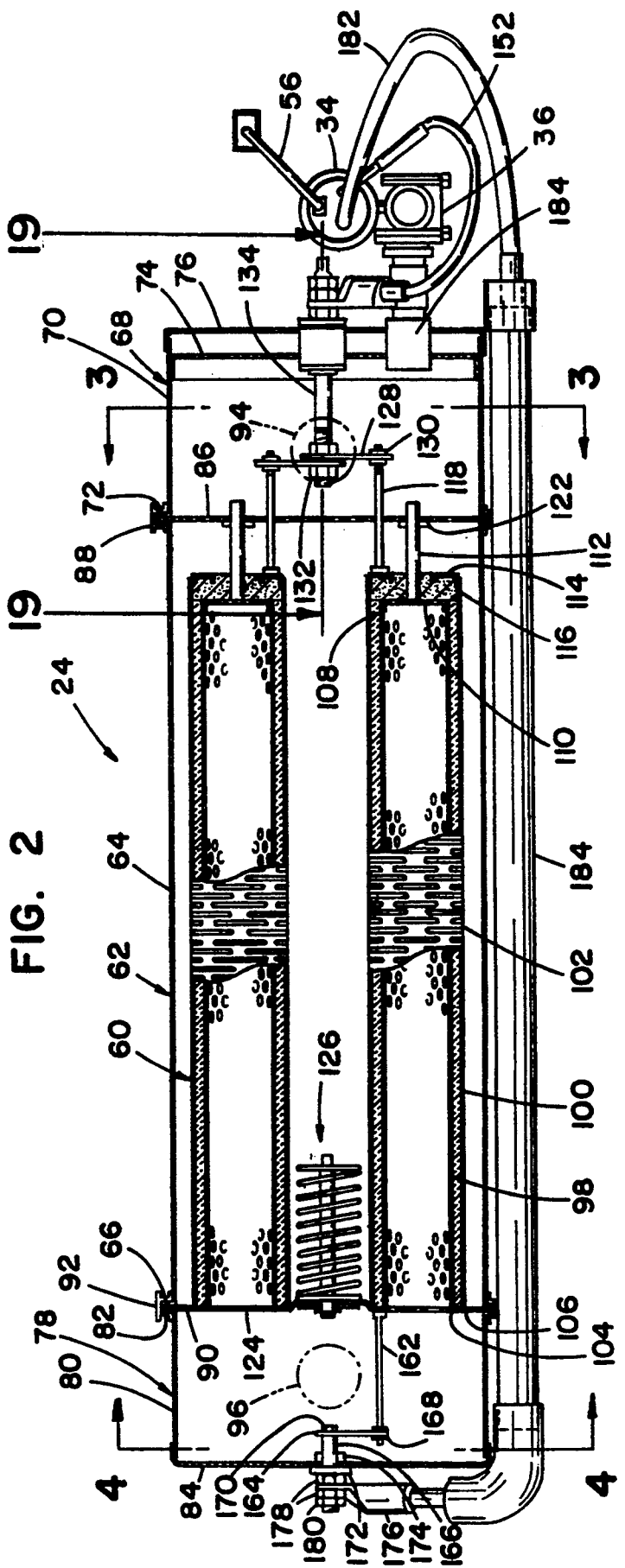
FIG. 2 is a cross-sectional view of a trap device, cut longitudinally through the device.

Trap 24 includes a plurality of filters 60 mounted appropriately in canister 62. Canister 62 is shown in a representative fashion, but it is understood that it may have a variety of equivalent configurations. As shown in FIG. 2, canister 62 includes a cylindrical mid-section 64 having flared ends 66. Upstream end section 68 has a cylindrical portion 70 with diameter equivalent to mid-section 64. Portion 70 also has a flared end 72. End section 68 has interior and exterior end caps 74, 76 which are spaced from one another to provide stability for electrical and air connections. Downstream end section 78 likewise has a cylindrical portion 80 with diameter equivalent to mid-section 64. Portion 80 has flared end 82. End cap 84 is attached to the opposite end of portion 80. Mid-section 64 and end section 68 squeeze perforated baffle 86 between flared ends 66 and 72 and are all held together by clamp 88. Similarly, flared ends 66 and 82 of mid-section 64 and end section 78, respectively, squeeze solid baffle 90 between them and are all held together by clamp 92. End sections 68, 78 include inlet and outlet tubes 94, 96.

Each filter 60 is the same. Trap 24 is shown to include three filters 60. It is understood that the trap could have one or more filters. It is further understood that the present filter is preferred, but that there may be numerous equivalents. The structural member 98 of filter 60 is a perforated internal tube. Filter media 100 is retained between member 98 and heater 102. Heater 102 is preferably slotted as described in detail in U.S. patent application Ser. No. 07/870,939, filed Apr. 20, 1992, hereby incorporated by reference. Filter media 100 may be constructed from ceramic fiber yarn, a woven matting from ceramic or metallic fiber or a non-woven, random array of fibers entangled together or bonded with a separate binder into a mat, or ceramic or metallic foams. Ends 104, 106 of member 98 and heater 102, respectively, are welded to baffle 90. End 108 of structural member 98 is closed with disk 110. A support pin 112 is fastened to the center of disk 110. An end retainer 114 is fastened to heater 102 and spaced from disk 110 and also spaced from support pin 112. Insulation 116 is retained between retainer 114 and disk 110, as well as between retainer 114 and filter media 100. An electrical stud 118 is fastened to retainer 114.

Support pins 112 and studs 118 extend through baffle 86. Support pins 112 are stabilized by baffle 86. Ring 122 is welded to baffle 86. Pins 112 slide in rings 122. In this way, filters 60 are held firmly in place by baffle 90 at one end and baffle 86 at the other end.

As indicated, baffle 90 is a solid plate except for openings 124 which expose the interior of structural members 98 and except for structure as required for the functioning of relief valve 126. In this way, exhaust gases flow into trap device 24 at inlet 94. The gases flow through perforated baffle 86 and then flow from outside to inside of each of filters 60 by passing first through heater 102, then the filter media 100, and finally the perforations of structural member 98. The filtered exhaust gases flow out openings 124 and exhaust trap 24 from outlet 96. It is understood that the outside to inside flow is preferred, but that the present invention also extends to inside to outside flow configurations.

Relief valve 126 is set to open if backpressure builds beyond a predetermined value. Such predetermined value is a greater pressure than that determined as the backpressure for fully loaded filters. Relief valve 126 is normally closed and opens to provide a flow path from the inlet side of baffle 90 to the outlet side.

Figure 3:
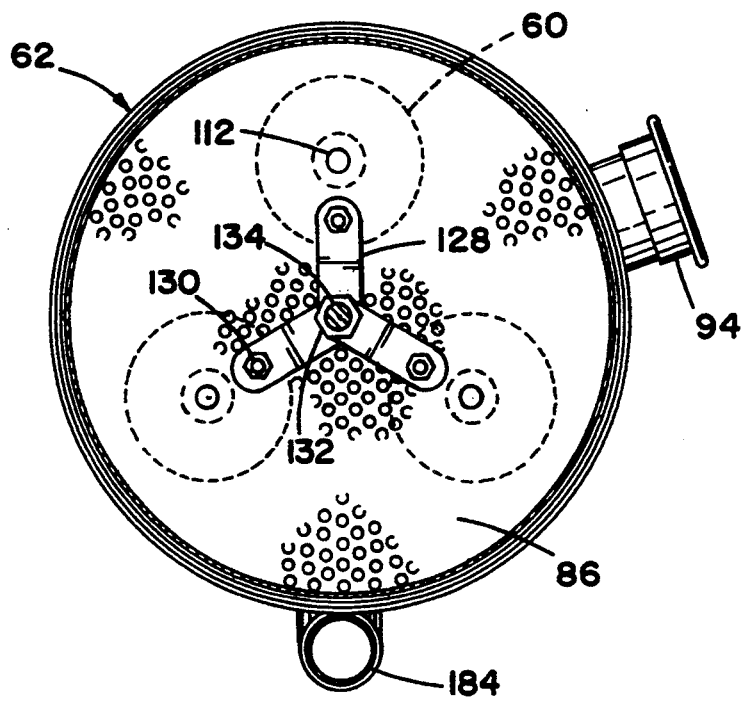
FIG. 3 is a cross-sectional view taken along line 3—3 of FIG. 2.

As indicated, electrical studs 118 extends through baffle 86 without touching it. An electrically conductive bar 128 is fastened between a pair of nuts 130 to the top end of each stud 118. The plurality of bars 128 as shown in both FIGS. 2 and 3 are then fastened between a pair of nuts 132 to main electrical stud 134. In this way, heaters 102 are connected electrically in parallel with references to a common ground.

Figure 19:
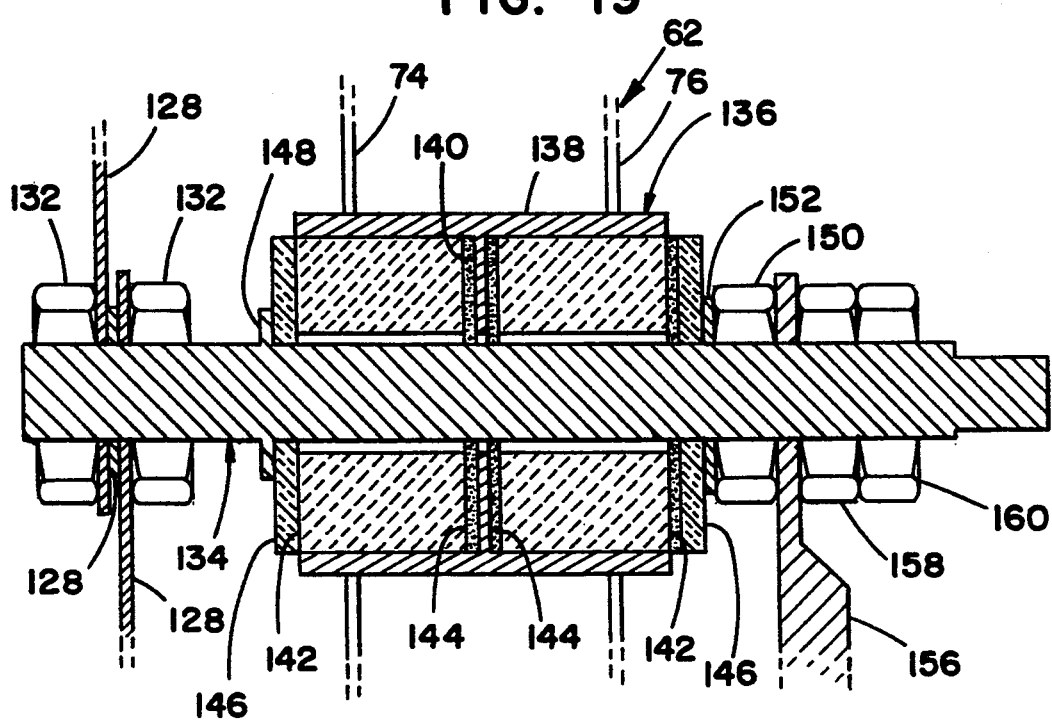
FIG. 19 is a cross-sectional view of the main insulator support housing for the main electrical stud of the trap device as taken along line 19—19 of FIG. 2.

With reference to FIG. 19, main electrical stud 134 is supported relative to housing 62 by main insulator support 136. Main insulator support 136 includes a cylindrical member 138 having a ring 140 fastened centrally therein. Ceramic rings 142 are installed on either side of ring 140. Silicone washers 144 are placed between ceramic rings 142 and ring 140. Woven insulator washers 146 are placed at the other ends of each of ceramic rings 142 with or without another silicone washer between the woven insulator and the ceramic ring. The woven washer on the interior of housing 62 is pressed against a flange 148 extending outwardly from main electrical stud 134. Nut 150 is tightened externally against a steel washer 152 to retain main insulator support 136 in place relative to canister 62. Cable 154 (see also FIG. 2) is fastened via a lug 156 to main electrical stud 134 with nut 158. A locking nut 160 locks the assembly together.

Figure 4:
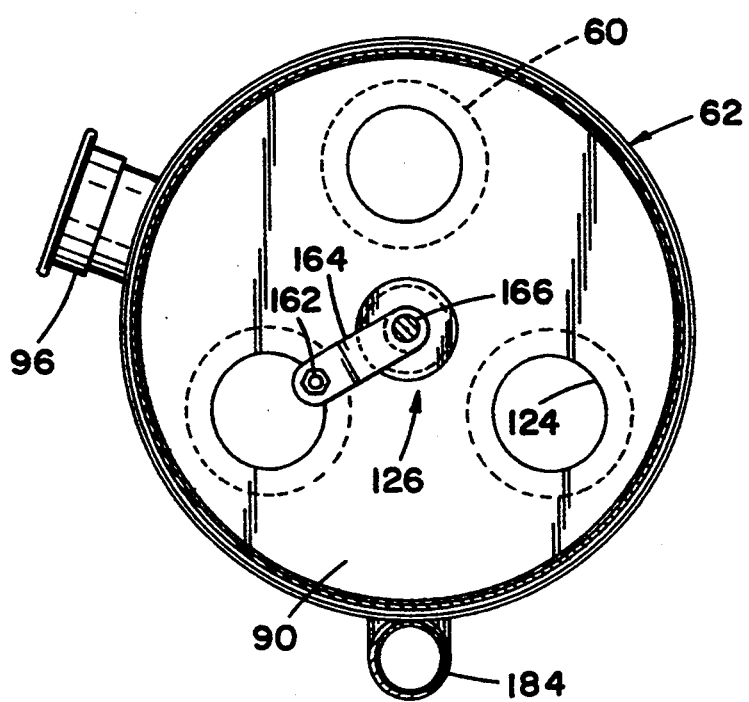
FIG. 4 is a cross-sectional view taken along line 4—4 of FIG. 2.

As shown in FIGS. 2 and 4, at the downstream end of trap device 24, an electrical stud 162 is welded or otherwise attached to baffle 90. A single electrically conductive bar 164 extends between stud 162 and main ground stud 166. Bar 164 is held in place to stud 162 with a nut 168 and, similarly, is held to main ground stud 166 with a nut 170. A flange 172 retains ground stud 166 on one side of end member 84, while a nut 174 retains it on the other side. Lug 176 is fastened to ground stud 166 with a pair of nuts 178 and can be locked in place with a lock nut 180. Lug 176 is in continuity with electrical cable 182 leading to plug 34. Cable 182 extends through pipe 184 along a side of trap device 24 to provide an orderly route for cable 182.

Although heaters 102 are electrically grounded through baffle 90 to canister 62, since heaters 102 are subjected to high power, the electrical ground of the power source is also completed as indicated via cable 182.

Fitting 184 is in fluid communication with air supply connector 36. Fitting 184 is fastened conventionally to canister 62.

Pull-Apart Connectors

Electrical connector 34 and combustion air connector 36 both pull apart along a straight line. As a result, if a trap is being regenerated and the vehicle operator inadvertently starts the engine and drives the vehicle away, both connectors disconnect without causing damage.

The vehicle side 186 of connector 34 includes a pair of high power transfer plugs 188 for making continuity with the power source 360 and a three-prong socket 190 for making continuity with cable 56 from the controlling mechanism 32. Plugs 188 and socket 190 are spaced-apart and held secure by molded urethane which forms a holding member 192.

The power source side 194 of connector 34 has a complementary pair of sockets 196 for receiving plugs 188 and a complimentary three-prong plug 198 for fitting in socket 190. Likewise, sockets 196 and plug 198 are spaced-apart by molded urethane to form holding member 200.

The power transfer plugs and sockets must provide sufficient surface contact area so that high current can be transferred without substantial heating. The present plug and socket combination is a half-inch in diameter and has one and a quarter-inch long contact length. The combination is rated for 400 amps. An appropriate plug and socket combination can be obtained as PN 1MPC from Tweco Products Inc., Box 12250-T, Witchita, Kans. 67277 and modified by disabling the twist-lock feature so that connection and disconnection is achieved simply by pushing and pulling appropriately. The three-prong socket and plug are available as IPC-66039A and IPC-66044A, respectively, from Bergquist Co., 5302 Edina Industrial Boulevard, Minneapolis, Minn. 55435.

Holding members 192 and 200 are formed so that the three-prong connector makes and breaks before the power transfer connectors. This is an important feature since current as high as 400 amps may be in the power lines and if the connection is being made manually, it is very important that there not be any sparking or flashing between the power transfer connector parts. Thus, the power transfer connectors are electrically dead until they are almost completely together since that is when the three-prong connector finally makes connection. Likewise, the power transfer connectors are electrically dead very soon after connector 34 begins to separate since the three-prong connector breaks contact at that time.

Air supply connector 36 is also a pull-apart connector. Plug 202 includes a ball check-valve 204 at the insertion end. Socket 206 likewise includes a ball check valve 208. When the plug and socket 202 and 206 are fully connected, the balls of the check valves 204 and 208 are in contact and have compressed the respective springs to open both valves. Check valve 208 prevents exhaust from flowing out the air supply line of the trap device when connector 36 is disconnected.

Socket 206 includes a plurality of small steel balls 210 which can be pressed against an elastic material 212. Plug 202 includes a double-ramped ring 214 with a trough 216 inwardly from the ring. The balls ride up the first ramp and over the ring into the trough to hold the plug and socket together. On disconnect, the balls ride up over the other ramp and over the ring to release.

An appropriate air supply connector 36 is available as part no. 5341K14 from McMaster Carr Supply Co., P.O. Box 4355, Chicago, Ill. 60680. The part is modified to disable any non-straight line, pull-apart locking mechanisms.

Controlling Mechanism

Controlling mechanism 32 monitors the loading of trap device 24 and when the power source 360 and the air source 362 are appropriately connected, controls the regeneration process. Since the construction of the controlling mechanism is conventional, only the logic needs to be discussed. In that regard, there are three portions of controlling mechanism logic. The first portion is empowered by the vehicle battery 46 via electrical cables 48 and 50 as depicted in FIG. 1. The first portion of the logic takes care of initialization. The second portion of the logic functions while the vehicle engine is operating. As a result, the second portion of the logic is empowered by the vehicle battery 46 through cables 50 and 52. Cable 52 is interrupted by the vehicle ignition switch 54. The third portion of the logic controls regeneration and functions when the engine is not operating. The third portion of the logic is empowered by power source 360 through terminal 34. The controlling mechanism logic functions the air source 362 and power source 360 through terminals 188 and 190. The controlling mechanism, the power source 360 and the air source 362 in housing 30 are in continuity as indicated through cable 56, three-prong plug and socket 198, 190 in connector 34, and cable 59.

Figure 9A:
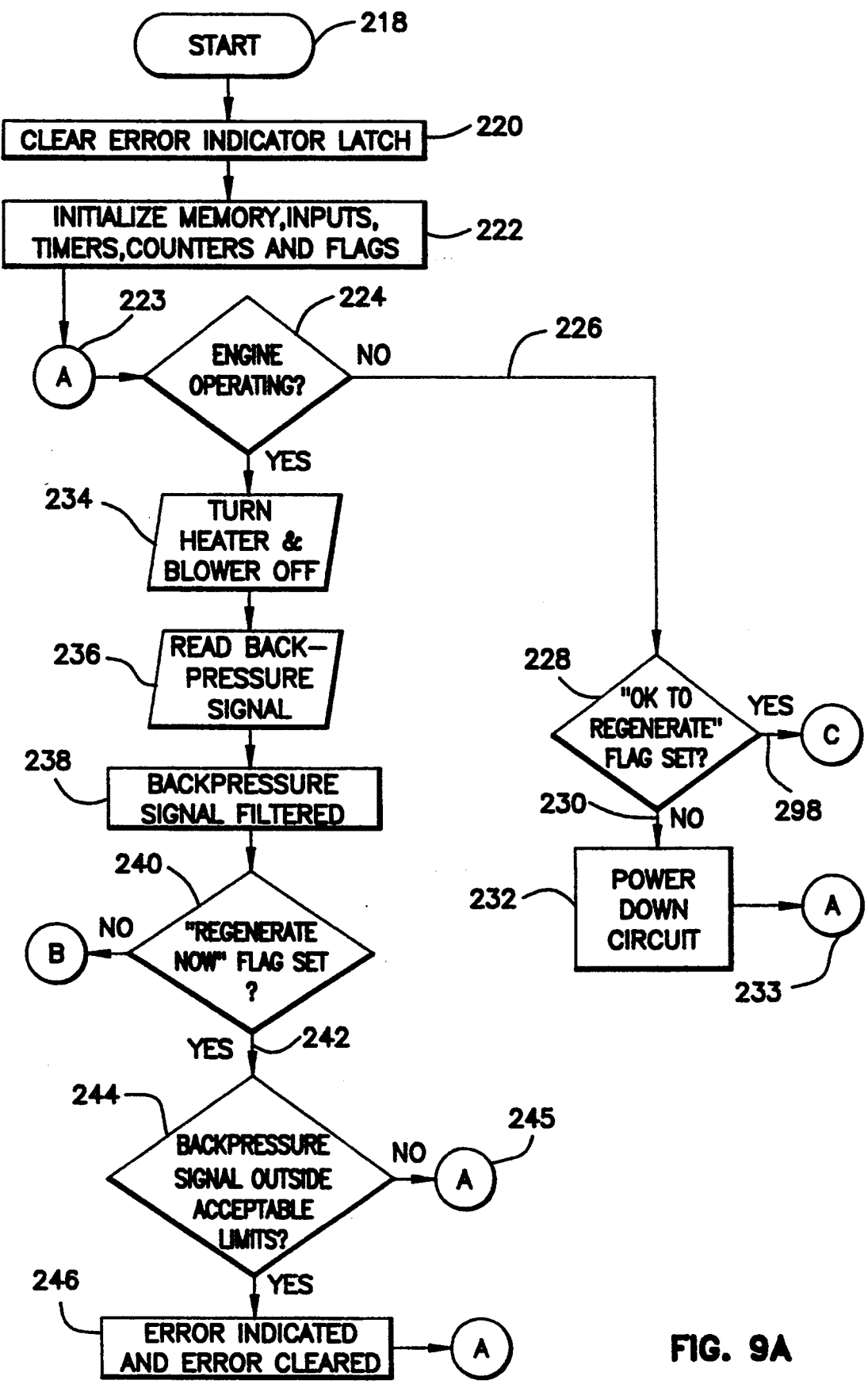
FIGS. 9A-D show a block diagram of the control logic in accordance with the present invention.

As shown in FIG. 9A, the first portion of the logic when power is first applied to it is indicated by oval box 218. The error indicator latch is cleared at box 220 and memory, inputs, timers, counters, and flags are initialized at box 222.

The second portion of the logic begins at bubble A represented by numeral 223. Bubble A leads to the engine operating decision box 224. If the engine is not operating as indicated by line 226, then as indicated at decision box 228, the decision is made whether the "okay to regenerate" flag has been set. If it has not as indicated at line 230, the circuit embodying the third portion of the logic (FIG. 9D) is powered down as indicated at box 232. The logic then returns to bubble A at 223. If the engine is operating as indicated at box 224, then as indicated at box 234, the heater and blower are turned off. Most commonly, the heater and blower are off. Box 234, however, takes care of the contingency when an operator inadvertently starts the engine during regeneration. When the engine starts, the heater and blower are immediately turned off in accordance with box 234.

At box 236, the backpressure signal is read as generated by a pressure transducer (not shown) monitoring backpressure due to trap 24 as communicated by air line 38. The backpressure signal is electrically filtered as indicated at box 238. The decision is then made whether the "regenerate now" flag has been set as indicated at box 240. If it has, then via line 242 to box 244, the decision is made whether the backpressure signal is outside acceptable limits. If it is not, control returns to bubble A at 223. If it is, as indicated at box 246, an error is indicated, and the error indicator latch is set. The latch remains set and the indicator remains on until the problem is corrected and the error latch cleared as shown in box 246. After the error has been cleared, control returns to bubble A at 223.

Figure 9B:
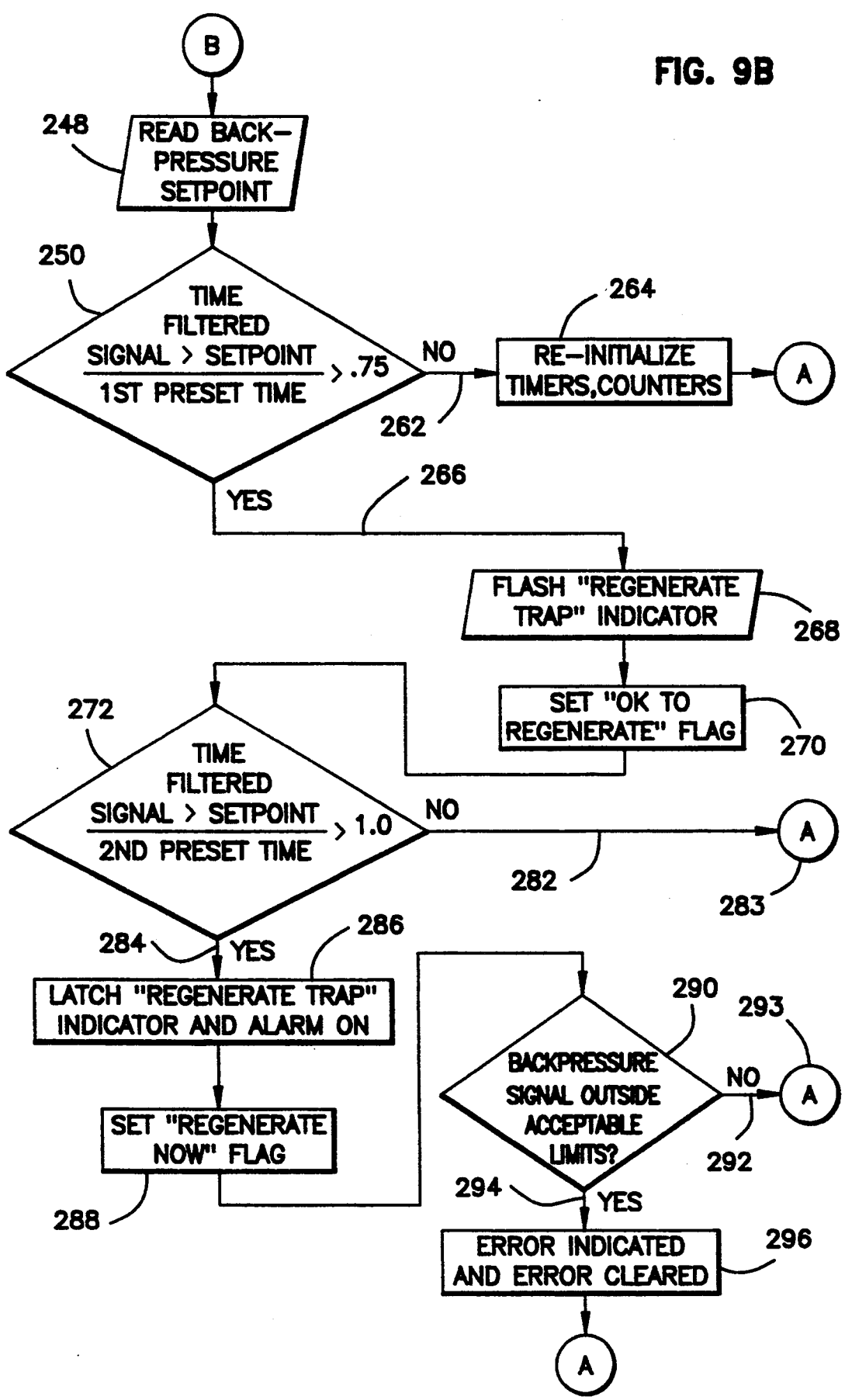

With reference to box 240, if the "regenerate now" flag is not set, then control shifts to bubble B as shown in FIG. 9B. As indicated at box 248, the backpressure set point is read. Then, as indicated at decision box 250, it is determined whether the trap is 75 percent loaded. That is, a determination is made when a first ratio is greater than a first predetermined value, namely, 0.75, which represents a 75 percent loading. The first ratio is a first measured time that the filtered backpressure signal is greater than the predetermined set point level as divided by or relative to a first predetermined time. The significance of this determination is illustrated in FIG. 10.

Figure 10:
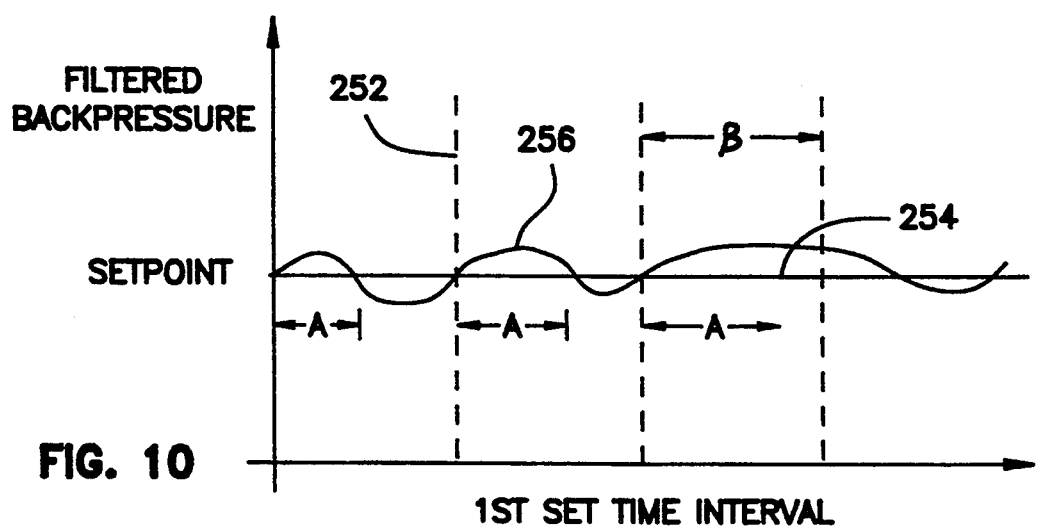
FIG. 10 is a graph of the filtered backpressure signal versus time; the graph relates to determining when regeneration may occur.
Figure 11:
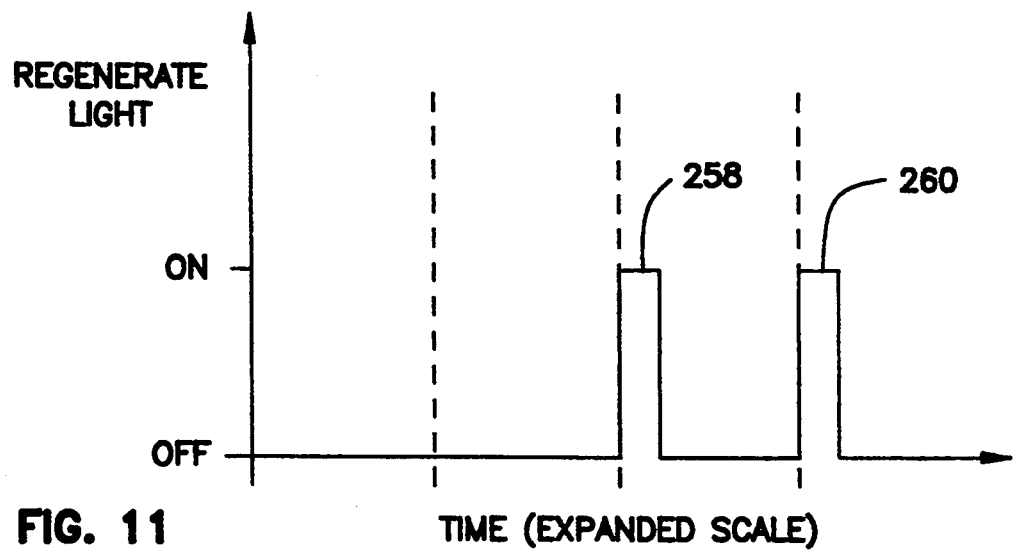
FIG. 11 is a graphic illustration of when the regeneration light is on relative to time with correspondence to FIG. 10.

FIG. 10 illustrates filtered backpressure versus time with set time intervals indicated by the broken vertical lines 252. The predetermined pressure set point is indicated at line 254. The filtered backpressure signal is indicated at wavy line 256. The set time interval is given the designation "B", while the measured time interval is given the designation "A". The graph in FIG. 11 corresponds to that of FIG. 10. It should be noted, however, that the results of the test of box 250, as illustrated in a time interval in FIG. 10, do not become manifested with the lighted regenerate light until the next time interval as indicated in FIG. 11. Thus, the first time interval of FIG. 10 does not result in a light-on condition, while the second and third intervals do so result, which is then indicated in the third and fourth intervals at horizontal lines 258 and 260 in FIG. 11.

Returning to decision box 250, if the inequality is not satisfied as indicated at line 262, then as indicated at box 264, reinitialization occurs and control is returned to bubble A at 223.

With further reference to decision box 250, if the inequality is satisfied, as indicated at line 266, then the "regenerate trap" indicator is flashed as indicated at box 268. Also, the "okay to regenerate" flag is set as indicated at box 270. Control then moves to decision box 272 to determine whether a second ratio is greater than a second predetermined value. The second ratio is a second measured time the filtered signal is greater than the predetermined set point level relative to a second predetermined time. The second ratio is measured against the second predetermined value of 1.0. If the ratio is greater than 1.0, the filtered signal is greater than the set point level for the entire period of the second predetermined time. Such condition indicates a loaded trap.

Figure 12:
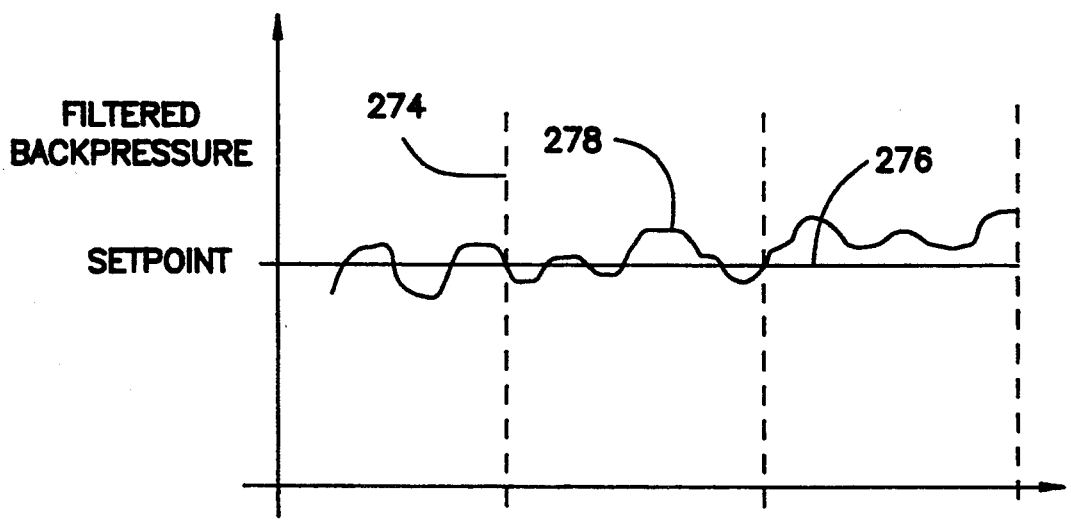
FIG. 12 is a graph of the filtered backpressure signal versus time; the graph relates to when regeneration must occur.
Figure 13:
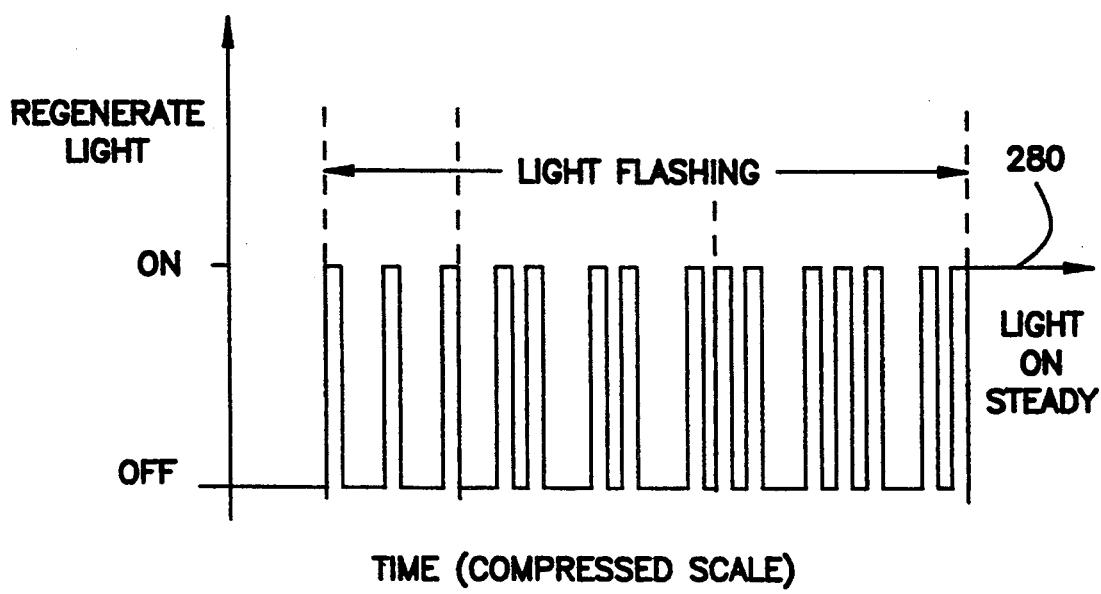
FIG. 13 is a graphic illustration of the conversion of when the regeneration light switches from flashing to steady on, with correspondence to FIG. 13.

With reference to FIG. 12, filtered backpressure is shown graphically with respect to time. A second time interval, preferably substantially greater than the first time interval shown in FIG. 10, is indicated by the vertical broken lines 274. The predetermined backpressure set point level is indicated by line 276. The electrically filtered backpressure signal is illustrated with wavy line 278. Line 278 is greater than the set point level for the entire period of the third interval shown. FIG. 13 graphically indicates that the regenerate light is flashing during time intervals up to the time interval just after the third interval, at which time the regenerate light goes on steady as indicated at line 280.

Returning now to decision box 272, if the inequality is not satisfied, as indicated at line 282, control returns to level A at 223. If the inequality is satisfied, as indicated at line 284, then as indicated at box 286, the "regenerate trap" indicator is latched on and the alarm is also turned on. At box 288, the "regenerate now" flag is set. Then, at decision box 290, the backpressure signal is checked to determine whether it is outside acceptable limits. If it is not, as indicated at line 292, control is returned to bubble A at 223. If it is, as indicated at line 294, then as indicated at box 296, an error is indicated and must be cleared as discussed before. Control is then returned to bubble A at 223.

When the engine is not operating with reference to box 224, and the "okay to regenerate" flag is not set, then the controlling mechanism circuitry remains powered down according to the loop between boxes 224 and 232. If the inequality at box 250 is satisfied, then the "okay to regenerate" flag gets set at box 270. Also, the "regenerate trap" indicator is flashed at box 268 each time the circuitry cycles between bubbles 283 and 223. If the inequality at box 272 is also satisfied, then the "regenerate now" flag at box 288 is set and thereafter the circuitry cycles between bubbles 293 and 223. The "regenerate trap" indicator and the alarm are also latched on at box 286.

Figure 9C:
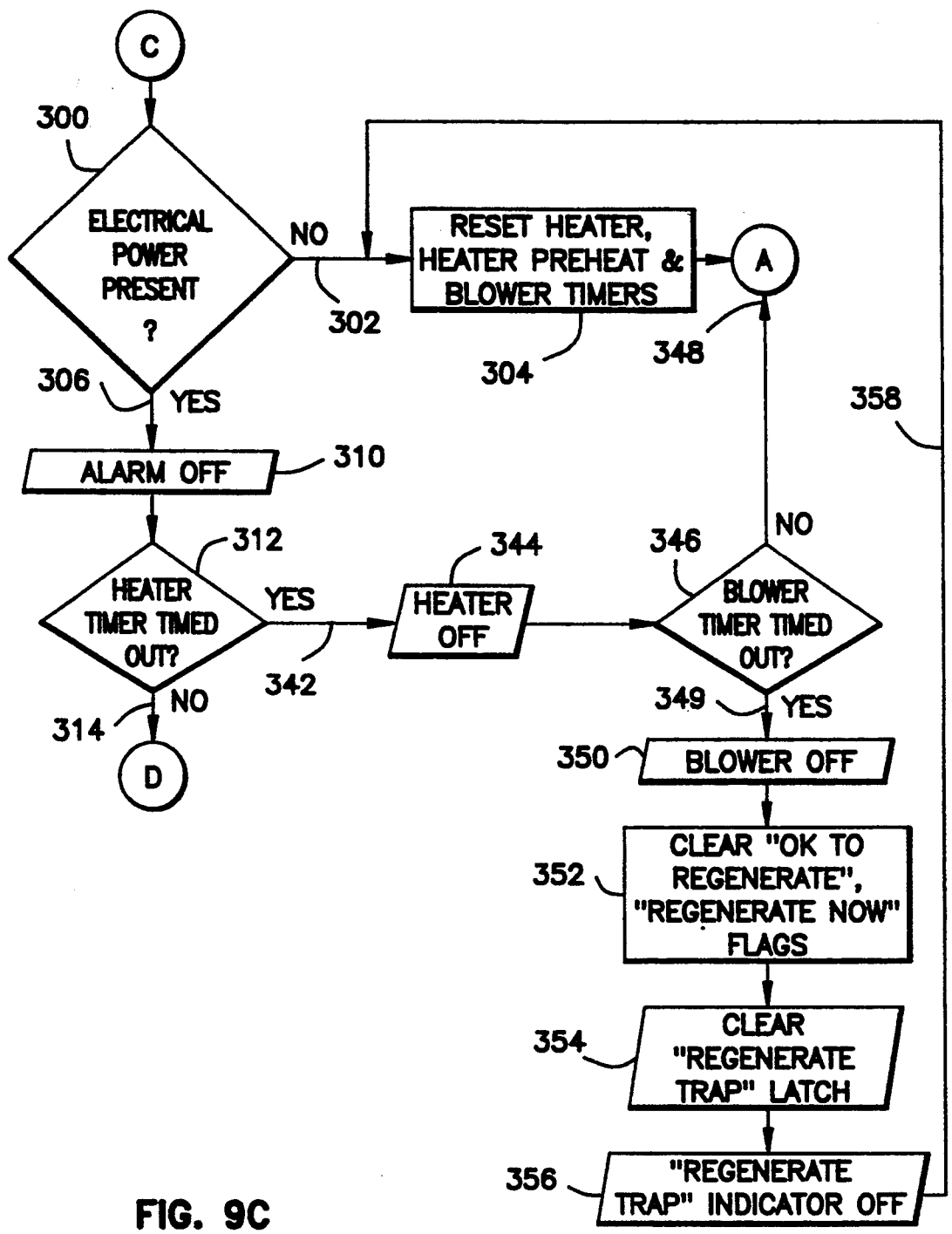
Figure 9D:
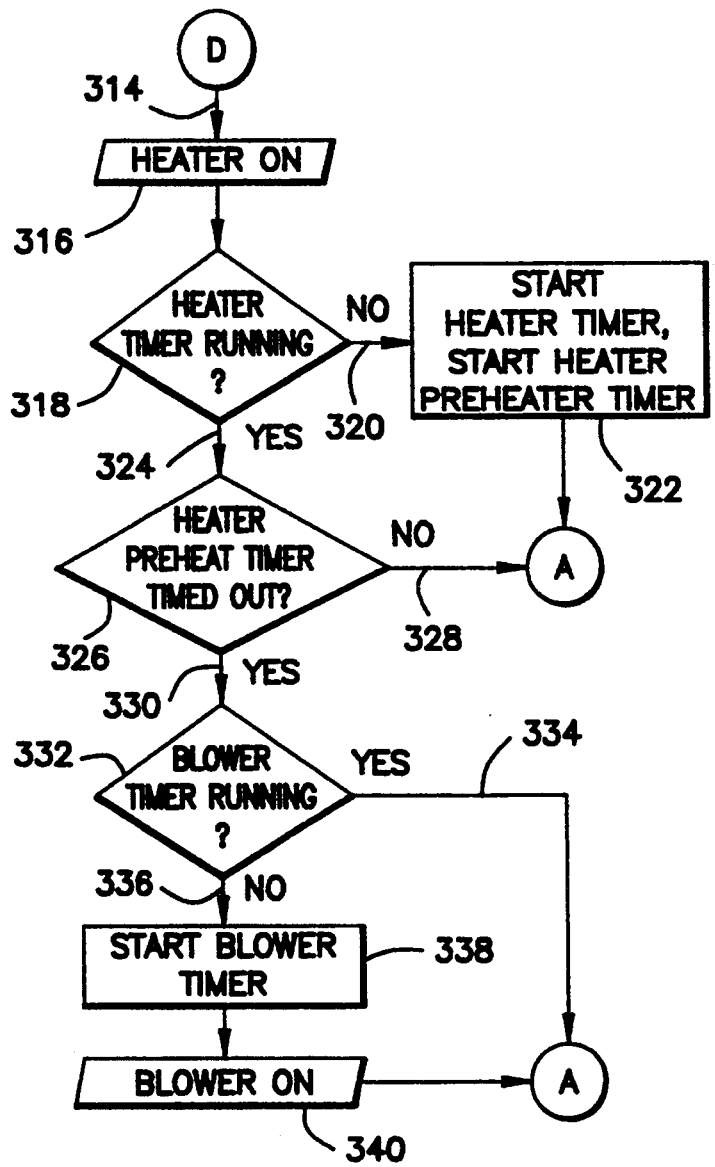

If the engine is not running and the "okay to regenerate" flag is set, then as indicated at line 298, control passes to the third portion of the logic as shown in FIGS. 9C and 9D. Beginning at bubble C as indicated at decision box 300, a determination is made whether connector 34 is connected so that electrical power is present. If it is not, then as indicated at line 302 leading to box 304, the heater, heater pre-heat, and blower timers are reset and control is transferred back to bubble A at 223. If electrical power is present at box 300, then as indicated at line 306 leading to box 308, on closing the manual regeneration initiation switch, the alarm is turned off as indicated at box 310. As indicated at decision box 312, a determination is made whether the heater timer is timed out. If it is not, then as indicated at line 314 leading to box 316, the heater is turned on. At decision box 318, a determination is made whether the heater timer is running. If it is not, as indicated at line 320 leading to box 322, the heater timer is started and also the heater pre-heater timer is started before transferring control back to bubble A at 223. If the heater timer is running at box 318, then as indicated at line 324 leading to decision box 326, a determination is made whether the heater pre-heat timer is timed out. If it is not, then as indicated at line 328, control is transferred back to bubble A at 223. If it is, then as indicated at line 330 leading to decision box 332, a determination is made whether the blower time is running. If it is, as indicated at line 334, control is transferred to bubble A at 223. If it is not, as indicated at line 336 leading to box 338, the blower timer is started and as indicated at box 340, the blower is turned on before control is passed to bubble A at 223.

At decision box 312, if the heater timer is timed out, then as indicated at line 342 leading to box 344, the heater is turned off. As indicated at decision box 346, if the blower timer is not timed out, then control is transferred as indicated at line 348 back to bubble A at 223. If the blower timer is timed out, then as indicated at line 349 leading to box 350, the blower is turned off. At box 352, the "okay to regenerate" and "regenerate now" flags are cleared. At box 354, the "regenerate trap" latch is cleared. At box 356, the "regenerate trap" indicator is turned off and, as indicated at line 358 leading back to box 304, the heater, heater pre-heat, and blower timers are reset before control is transferred back to bubble A at 223.

With the present configuration, the heater is turned on before the blower, and it is turned off before the blower. It is understood that there are configurations within the concept of the present invention wherein different sequencing of the heater and blower would occur.

Power and Air Sources

Figure 14:
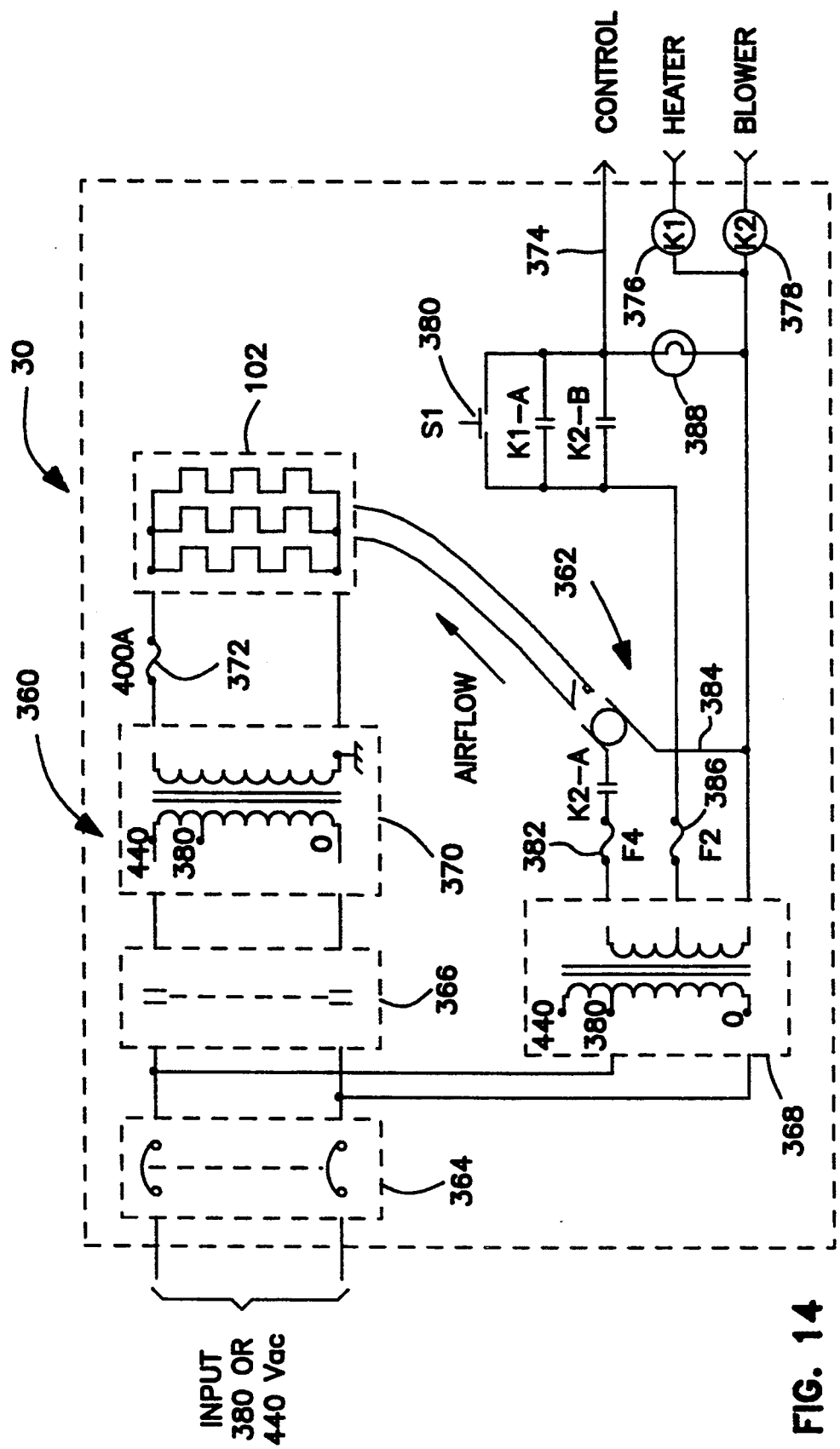
FIG. 14 is a schematic illustration of the electrical power source and the combustion air source when the heaters are connected in parallel.

With reference to FIG. 14, power source 360 and air source 362 as contained in housing 30 are schematically illustrated. Implementation of the illustration is conventional to those skilled in the art, and it is understood that equivalents are likely.

The power source 360 obtains input power from a standard high voltage line at 380 volts AC or 440 volts AC. The power passes through a circuit breaker 364, preferably rated for 30 amps. The power is then directed in parallel to contactor 366 and to control transformer 368. When contactor 366 is closed, power is directed to power transformer 370 where the voltage is stepped down preferably to 27 volts AC. The reduced voltage power is then made available at very high current levels to heaters 102 through a fuse 372 rated at 400 amps.

Control transformer 368 is connected through fused F4 at 382 and relay K2 at 378, as well as line 384 to a blower which is the combustion air source 362. The line leading to the control mechanism from control transformer 368 leads through fused F2 at 386 and switch S1 at 380 to control line 374.

Regeneration starts when switch S1 at 380 is depressed. If controlling mechanism 32 permits a regeneration; that is, if the "okay to regenerate" flag at box 270 is set, electrical power on the control line 374 is sensed and the decision at box 300 is line 306. In accordance with the logic of the controlling mechanism, the alarm is turned off at box 310 and the heater at box 316 is turned on by energizing relay K1 at 376. Relay K1 energizes contact with 366 and latches the electrical power on so that the power remains even when switch S1 is released. Contact with 366 turns on the heaters to effect a regeneration. The controlling mechanism actuates the air source 362 by actuating relay K2 at 378 when the regeneration process requires combustion air. When regeneration is completed, relays K1 and K2 are energized in accordance with the controlling mechanism logic, thereby opening contact at 366 to turn off power to the heaters and with K2 energized, power is likewise turned off to the blower.

Light 388 lights when regeneration is started and goes off when regeneration ends.

Use

Figure 15:
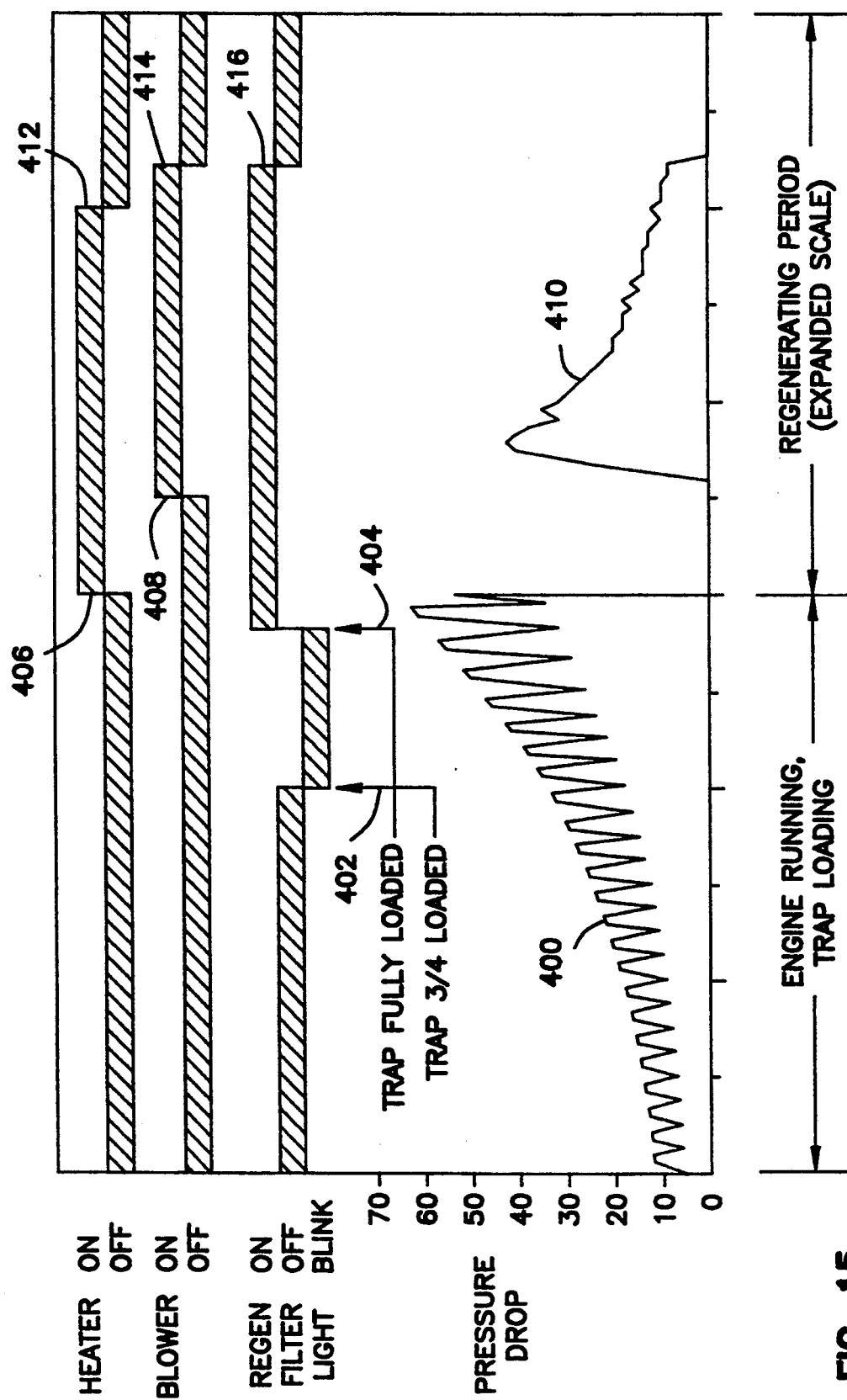
FIG. 15 is a graphic illustration of various features of the present invention relative to one another over time.

With reference to FIG. 15, a graph showing pressure drop across the trap as a function of time, both while the engine is running and while it is off and the trap is being regenerated, is shown. Additionally, illustrations of the regeneration light and the heater and blower functions relative to the pressure drop curves are illustrated. More particularly, line 400 illustrates a cycling between a lower and a higher pressure drop which represents a common cycle of a fork-lift vehicle running between idle and full throttle. Over time, both the low and high pressure drop increase as the trap device loads.

The bar chart illustrating the regeneration filter light as being on, off, or blinking depicts a 75 percent loaded condition 402 and a fully loaded condition 404. At the 75 percent loaded condition, as discussed earlier with respect to box 268 of the logic for the controlling mechanism, the loading indication to the vehicle operator in the form of the regeneration light switches from off to blinking. At the fully loaded condition, the light, as indicated with respect to box 286, switches from blinking to constant on. At the same time, a sound indication, such as a buzzer or a beeper, preferably also switches on as an added alarm. The operator should then proceed to a regeneration station to have the trap device regenerated. As indicated, line 400 indicates continued engine functioning and trap loading beyond the fully loaded condition represented by line 404.

When the vehicle is parked for regeneration, electrical power connector 34 and combustion air connector 36 are both connected. The power plug from housing 30 is plugged into a line power source and switch 51 is engaged. Assuming engine 44 is off, controlling mechanism 32 takes over control of the regeneration process as described in FIGS. 9A-D. As illustrated in FIG. 15, the heater is first turned on at 406 and provides a preheating period before the blower is turned on at 408. Shortly after that, combustion is initiated and as depicted by line 410, any pressure drop across the trap starts decreasing as the carbon particulates are burned away. The audible alarm as indicated at box 310 goes off when regeneration is initiated. The steady on regeneration light, however, stays on until regeneration is completed. Near the end of the regeneration process, as depicted at line 412, the heater is first turned off. The blower continues to provide air not only to allow combustion to be completed, but also to cool the heaters. The blower providing combustion air is then turned off at 414, a short time after the heaters are turned off. The regeneration light also is switched off at 416.

When connectors 34 and 36 are disconnected, vehicle 22 is again available for service.

The present inventive system uses high power to achieve a rapid heating and combustion of the loaded particulates. At a voltage of 27 volts AC with currents ranging to 400 amps, regeneration is completed in under 5 minutes in usual circumstances. The level of loading depends on the particular design of the filters. With the filters indicated and a construction having an outside to inside flow with the heater external of the filter media, it is expected that off-road vehicles can be driven for many hours before regeneration is necessary. For example, most fork-lift trucks should be able to be driven for at least 8 hours.

The present system exhibits advantage in having the heater on the outside with the outside to inside flow. In this way, the heater is cooler when it is on the outside than on the inside. Heaters on the inside become very hot as regeneration about them takes place and heat collapses in on them. An outside heater, on the other hand, is at the coolest location and furthermore can radiate heat outwardly. Also, when combustion occurs, the burning progresses from the heater to the center core so the heat progresses away from the heater. As a consequence of this configuration, each filter tube can typically load several times more than if the filter tube were designed with the heater on the inside.

Heaters in Series

Figure 16:
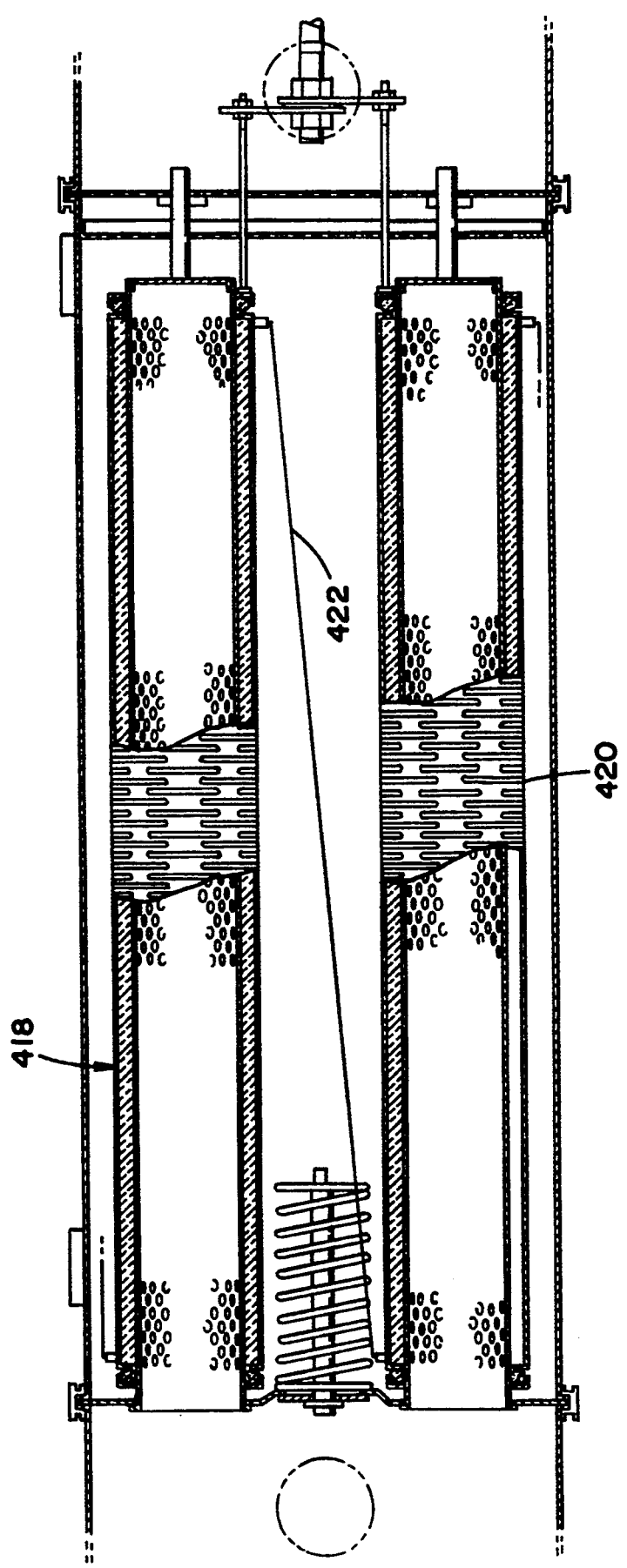
FIG. 16 is a cross-sectional view of the trap device showing the heaters connected electrically in series.
Figure 17:
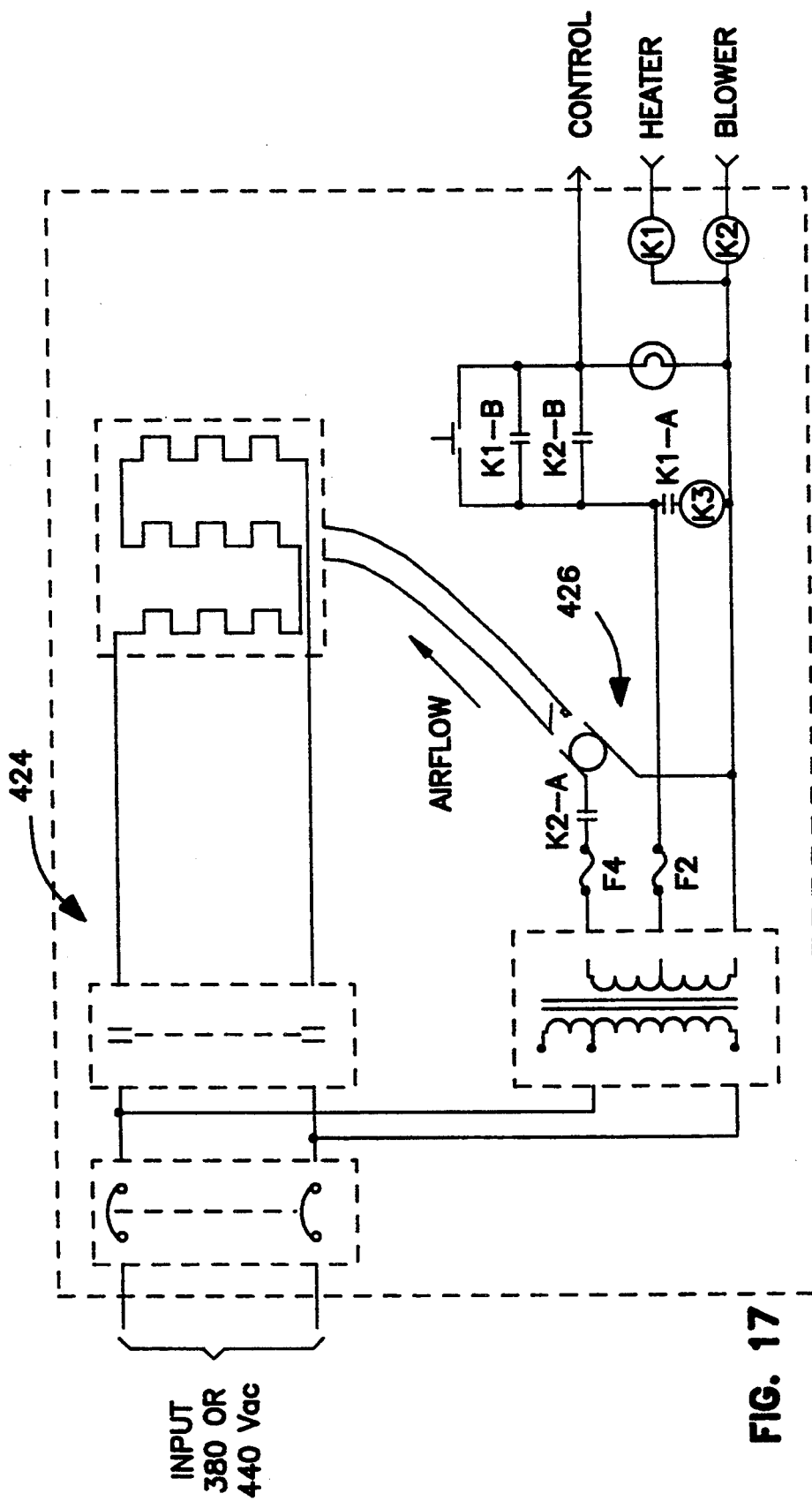
FIG. 17 is a schematic illustration of the electrical power source and the combustion air source when the heaters are connected in series.
Figure 18:
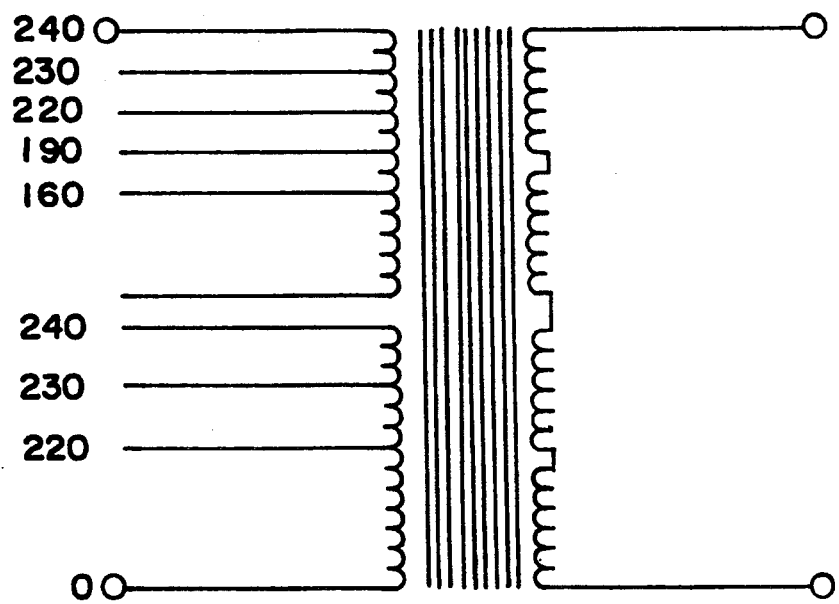
FIG. 18 is a schematic of a multi-tap power transformer which is of use in the present invention.

The present diesel exhaust filter system has been described with the filters 60 having heaters 102 configured electrically in parallel. The heaters can also be configured electrically in series, as shown in FIGS. 16-17.

Filters 418 are similar to filters 60 in FIG. 2, except the heater 420 is electrically isolated at both ends from structure leading to ground. Also, one end of one filter is wired in continuity to the other of an adjacent filter to provide the series wiring configuration as depicted by line 422.

Similarly, the power and air sources 424 and 426 are configured similar to those described with respect to FIG. 14, except the power transformer is not required.

Thus, the present invention has been described in detail with respect to a preferred embodiment with reference to a fork-lift truck. An alternate wiring of the heaters in the trap device is indicated. It will likewise be understood by those skilled in the art that numerous equivalents are within the concept disclosed. As a consequence, it is understood that the principal of the present invention is limited only by reference to the claims which follow.

What is claimed is:

1. An exhaust filter system for a vehicle with a diesel engine, comprising:

a trap device including a filter installed in a housing, said trap device being mounted on said vehicle, said trap device for removing particulates from exhaust gases of said engine;

a regeneration arrangement for said trap device, said regeneration arrangement including a heater in close proximity to said filter in said housing, said arrangement further including means separate from said vehicle for providing electrical power to said heater for regeneration of said filter and means separate from said vehicle for providing combustion air for regeneration; and means mounted on said vehicle for controlling said regeneration arrangement, said electrical power providing means including power source means and first means for connecting to one another said controlling means and said heater to said power source means, said power source means including transformer means for powering said heater and switching means for controlling said transformer means, said first connecting means including first and second mating members, said first member having a pair of first sockets in electrical continuity with said transformer means and a first plug in electrical continuity with said switching means, said second member having a pair of second plugs in electrical continuity with said heater and a second socket in electrical continuity with said controlling means.

2. The system in accordance with claim 1 wherein said first and second members include means for holding said plugs and sockets so that said first plug and second socket connect after and disconnect before said first sockets and second plugs connect and disconnect, respectively.

3. The system in accordance with claim 1 wherein said transformer means includes a transformer with a primary winding and a secondary winding, said primary winding having means for receiving at least eight different voltage levels so that it may be used in most areas of the world regardless of voltage levels available.

4. An exhaust filter system for a vehicle with a diesel engine, comprising:

a trap device including a filter installed in a housing, said trap device being mounted on said vehicle, said trap device for removing particulates from exhaust gases of said engine;

a regeneration arrangement for said trap device, said regeneration arrangement including a heater in close proximity to said filter in said housing, said arrangement further including means separate from said vehicle for providing electrical power to said heater for regeneration of said filter and means separate from said vehicle for providing combustion air for regeneration, said combustion air providing means including air source means and first means for connecting said air source means to said housing, said first connecting means including a check valve for preventing passage of exhaust gases from said housing to said air source means; and means mounted on said vehicle for controlling said regeneration arrangement, said electrical power providing means including power source means and second means for connecting to one another said controlling means and said heater to said power source means, said controlling means including means for preventing said electrical power providing means and said combustion air providing means from operating while said engine is running.

5. A method for using an exhaust filter system for a vehicle with a diesel engine, said system including a trap device mounted on said vehicle, said system further having a regeneration arrangement and means mounted on said vehicle for controlling said regeneration arrangement, said method comprising the steps of:

running said engine;

sensing backpressure to said engine from said trap device and creating an associated electrical signal;

electrically filtering said electrical signal to create a filtered signal;

determining when a first ratio is greater than a first predetermined value, said first ratio being a first measured time said filtered signal is greater than a first predetermined level relative to a first predetermined time;

providing an indication that said trap device may be regenerated;

stopping said engine; and regenerating said trap device.

6. The method in accordance with claim 5 wherein said trap device has a filter and said regeneration arrangement has a heater in close proximity to said filter, said regeneration arrangement further having means for providing electrical power to said heater and means for providing combustion air for regeneration, said regenerating step including the steps of:

heating said filter with said heater by directing with said controlling means electrical power to said heater from said electrical power providing means, said electrical power providing means being separate from said vehicle;

flowing from said combustion air providing means as directed by said controlling means combustion air passed said filter, said combustion air providing means being separate from said vehicle;

stopping the heating of said filter with said heater; and stopping the flowing of said combustion air from said combustion air providing means passed said filter.

7. The method in accordance with claim 5 including following said determining step the step of providing with said controlling means a first indication that said trap device may be regenerated.

8. The method in accordance with claim 7 further including the steps of:

determining when a second ratio is greater than a second predetermined value, said second ratio being a second measured time said filtered signal is greater than a second predetermined level relative to a second predetermined time; and providing a second indication that said trap device must be regenerated.

9. The method in accordance with claim 8 following said regenerating step the step of turning off the second indication.

10. The method in accordance with claim 5 including the step of stopping said regenerating when said engine is restarted.

* * * * *